Patented Oct. 30, 1951

2,572,876

UNITED STATES PATENT OFFICE 2,572,876

POLYMERIZATION OF AN ALKOXY HYDROCARBON SILANE BY OXIDATION

John B. Rust, Montclair, and Charles A. MacKenzie, East Orange, N. J., assignors, by direct and mesne assignments, of one-half to Montclair Research Corporation, a corporation of New Jersey, and one-half to Ellis-Foster Company, a corporation of New Jersey No Drawing. Application October 23, 1945,
Serial No. 624,098

14 Claims. (Cl. 260—2)

This invention relates to the production of organo silicon polymers, and more particularly to converting organo silicon derivatives, or partially polymerized derivatives, or soluble organo silicon polymers, into hard, tough, insoluble resins, desirably in the presence of catalysts and at low temperatures, to the products obtained, and to methods of producing them.

As is well known, numerous processes have been advanced to secure organo silicon polymers which are readily soluble in hydrocarbons and other solvents. These soluble polymers are then converted to insoluble, infusible resins by heating or baking at 150°–300° C. for several hours. Such baked products are very hard, but also exceedingly brittle.

Among the objects of the present invention is to provide insoluble, infusible organo silicon resins by baking or heating for example a soluble organo silicon polymer at a low temperature as for example 120 to 150° C. in the presence of a peroxide catalyst.

A further object of the present invention is to provide insoluble, infusible organo silicon resins which are self-plasticized or self-plasticizing, that is, silicon resins which contain in their structure a plasticizing group as for example radicals derived from the organic peroxide used as a catalyst.

A still further object is to provide insoluble, infusible organo silicon resins by baking or heating a soluble organo silicon polymer, for example, at a low temperature in the presence of a metallic peroxide catalyst.

Other and further objects and advantages of the present invention will appear from the more detailed description set forth below, it being understood that this more detailed description is given by way of illustration and explanation, only, and not by way of limitation, since various changes therein may be made by those skilled in the art without departing from the scope and spirit of the present invention.

In accordance with the present invention, it has been found that peroxides may be utilized to secure insoluble, infusible silicon resins from organo silicon derivatives. The peroxides may be organic or inorganic, and may be gaseous, liquid or solid. Such resins may be obtained by heating the organic silicon derivative at relative low temperature, as for example from 100° to 150° C. for such time as is necessary, usually several hours, in the presence of a catalytic amount of peroxide, as for example from 1 to 5% of organic peroxide, to produce the desired conversion. Various methods of carrying out the treatment may be used and the treatment with peroxide may be carried out in the presence of oxygen such as air, or a treatment with air may precede or follow the treatment with peroxide. For example, the organo silicon derivative may be heated at temperatures of say 100° to 200° C. in the presence of a stream of dried air to increase the viscosity somewhat, followed by continued heating at for example 100° to 150° C. in the presence of the peroxide, such as organic peroxide, to secure the desired cured resin. Or the organo silicon derivative may be treated with a current of dried air at say 100° to 150° C. in the presence of the organic peroxide or other peroxide. The treated product may be subjected to a further baking operation and any combination of such treatment steps may be employed. Such heat treatment or baking operation may be applied as a continuation of the oxidation treatment either at the same or a different temperature, and the product may be in any desired form at the time of such treatment, for example the peroxide treatment may be applied to the derivative while the latter is present as a film or coating on an article and the heating continued of such thin film or coating. The heat treatment may be applied in the presence of peroxide while the organic silicon derivative is present in solution in organic solvents or while in suspension, or the silicon derivatives may be treated in the absence of any solvent or other medium.

A variety of silicon derivatives may be treated in accordance with the present invention. Esters of silicic acid, such as of orthosilicic acid, which esters may contain the same or different organic groups constituting the esterifying groups in the same molecule, or mixtures of different esters, may be treated. It is not necessary to use pure esters per se in carrying out the invention, but the reaction mixtures produced in the formation of the esters may be employed without separating the individual esters from such reaction mixtures. The same considerations apply to esters of other silicic acids that may be used, as for example the esters of orthosilicoformic acid.

The esters, particularly the tetra esters of ortho silicic acid may be formulated as follows:

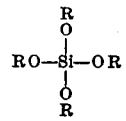

The esters of orthosilicoformic acid may be formulated as

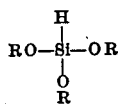

Esters of di- and polysilicic acids may be used. For example the di-silicic acid esters may be formulated as

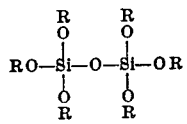

while the esters of polysilicic acid would be represented as

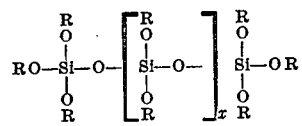

Any of these esters may be treated, as for example the esters of silicoformic acid, alkoxy silicons, more particularly alkoxy alkyl silicons, alkoxy aryl silicons, and alkoxy cyclic non-aromatic silicons, with dried air at temperatures as indicated above to partially polymerize them followed by the peroxide treatment or other combinations as set forth above may be used.

In the above formulations, the organic group R may be the same or different groups selected from alkyl, aryl, olefinyl, alkenyl, alkynyl, arenyl, arynyl, alicyclic, cycloaromatic, aralkyl, etc., illustrated by methyl, ethyl, propyl, butyl, amyl, hexyl, heptyl, octyl, vinyl, allyl, butenyl, the radicals from acetylene, methyl acetylene, propyl acetylene, cyclohexyl, benzyl, phenyl, tolyl, xenyl, chlorphenyl, styryl, and radicals from such derivatives as phenylacetylene, etc. As exemplary of specific esters there may be mentioned for example, ethyl orthosilicate, propyl orthosilicate, butyl orthosilicate, amyl orthosilicate, and the like, or mixed esters of silicic acid such as methyl butyl orthosilicate, ethyl propyl orthosilicate, benzyl ethyl orthosilicate, etc., and various others some of which are illustrated in the examples below. Such organo groups may contain substituent groups such as halogen etc.

The peroxides employed may be illustrated by the organic peroxides which are most suitable including such peroxides as benzoyl peroxide, tertiary butyl hydroperoxide, acetyl peroxide, cyclohexyl hydroperoxide, lauroyl peroxide, etc. Driers such as cobalt naphthenate, lead naphthenate, manganese naphthenate, and the like, may also be employed to secure more rapid hardening of films. Peroxides, perhydrols, and persalts particularly inorganic or metallic, may be used. Such metallic oxides as vanadium pentoxide, aluminum oxide, and the like may be used. Examples will be given below employing zinc peroxide, sodium perborate, ammonium perborate, etc.

The temperature at which the reaction is carried out should be sufficient to yield a satisfactory speed of reaction and the desired effect and for these purposes elevated temperatures are preferred, as for example, temperatures above 100° C. up to the boiling point of the ester undergoing treatment and even higher temperatures if pressure is employed. But a preferred range of temperatures is that from 100° to 200° C. The reaction may be carried out in stages in which successively different temperatures are employed, as for example, higher temperatures in a first stage of reaction followed by lower temperatures in a later stage, or vice versa; and such stages of treatment may be employed where the combination of air and of peroxide treatments are being utilized.

Where an air treatment step is used, it may be carried out by blowing air through the organo silicon derivative undergoing treatment while the latter is in liquid condition, as when the derivative is liquid at the temperatures of treatment, or in solution in solvents which preferably are inert to the oxygen treatment.

The products of the invention are generally speaking hard, tough resins, which may be in the form of baked coatings, laminated products, moldings, and the like. The principal objective is to enable such products to be produced at substantially lower temperatures and in shorter baking periods.

While aerated esters have been particularly emphasized above, other types of organo silicon derivatives may be treated in accordance with the present invention, for example, hydrolyzed silicones may be cured by means of peroxides. Thus hydrolyzed partially polymerized silicones such as the products available on the market under such names as Dow Corning resin solution No. 2052, may be treated by the methods set forth herein, i. e., such material either per se or in solution in for example toluene, and may be cured as in the form of a film, the curing being accelerated by peroxides such as benzoyl peroxide, particularly in combination with driers such as lead naphthenate. Or mixtures of such hydrolyzed silicones with any of the ester of silicic may be treated as set forth herein.

The following examples will serve to illustrate the invention, without limitation thereon, parts being by weight unless otherwise indicated.

*Example 1.*—Ethyl silicate $(C_2H_5)_4SiO_4$ was heated at 160° C. while dry air was passed through it for 5 hours. The ethyl silicate became very viscous and was thinned with xylol to form a solution containing 75% solids. A film baked for 2 hours at 150° C. was hard and tough. It cracked, however, on cooling.

A second film, to which 2% benzoyl peroxide was added, was baked at 150° C. for ½ hour. The film was clear, hard, and tough. Continued heating of the film for 2 hours caused no cracking after cooling.

*Example 2.*—Ethyl triethoxy silane

$$C_2H_5Si(OC_2H_5)_3$$

was heated at 135° to 140° C. for 6 hours, and at 150° to 175° C. for 6 hours while dried air was passed through. A viscous syrup was secured which was dissolved in xylol to form a clear solution. A film of the aerated silane was baked at 150° C. for 1 hour. The film was rubbery, it cracked and peeled from the glass. A film of the above xylol solution containing 2% benzoyl peroxide was also baked at 150° C. for 1 hour. The film was brittle, hard, and peeled from the glass.

*Example 3.*—Dibutyl diethoxy silane

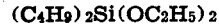
$$(C_4H_9)_2Si(OC_2H_5)_2$$

was heated at 160° C. and for 10 hours at 180° C. while air (dry) was passed through. A pale colored syrup was secured which was dissolved in toluol to form a solution containing 65% solids. A film baked at 100° C. for 16 hours was tacky.

Further baking at 150° to 160° C. for 5 hours gave a film which was rubbery and non-tacky. The film peeled and cracked from the glass.

A film containing 2% benzoyl peroxide was baked for 16 hours at 100° C. and was soft but tack-free. Further baking at 150° to 160° C. for 5 hours gave a film which was rubbery and hard. The film peeled and cracked from the glass.

*Example 4.*—Tetra phenyl silicate $(C_6H_5)_4SiO_4$ was heated at 170° to 180° C. for 8 hours while dry air was passed through. A pale colored syrup was secured which was dissolved in xylol to form a clear solution containing 75% solids. A film baked at 120° C. for 8 hours was hard, non-tacky, and could be marked with the finger nail. A film baked at 120° C. for 8 hours in the presence of 5% butyl hydroperoxide and at 100° C. for 6 hours was hard and tough and could not be marked with the finger nail.

*Example 5.*— Monophenyl triethoxy silane 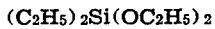 $C_6H_5Si(OC_2H_5)_3$ was heated for 12 hours at 170° to 180° C. for 8 hours while dry air was passed through. A dark colored, viscous liquid was secured. A film of the liquid gave a hard, somewhat brittle film on baking at 150° C. for 6 hours. A film containing 1% benzoyl peroxide gave a hard, tough film on baking at 150° C. for 1 hour.

*Example 6.*—Monocyclohexyl triethoxy silane $(CH_2)_5CHSi(OC_2H_5)_3$ was heated for 6 hours at 170° to 180° C. while dry air was passed through. A viscous liquid was secured. A film of the liquid gave a hard, tough film on baking at 150° C. for 2 hours. A film containing 2% benzoyl peroxide gave an exceedingly hard tough film on baking at 120° C. for 2 hours.

*Example 7.*—Diethyl diethoxy silane $$(C_2H_5)_2Si(OC_2H_5)_2$$

was heated for 4 hours at 120° C. and for 6 hours at 150° C. while air was passed through. A viscous liquid was secured which was thinned with xylol to form a solution containing 75% solids. A film baked for 16 hours at 100° C. was clear and slightly tacky; it possessed a Sward rocker hardness of 7. A film containing 2.5% benzoyl peroxide was baked at 100° C. for 16 hours. It was clear and completely tack-free; and possessed a Sward rocker hardness of 19.

*Example 8.*—Diethyl diethoxy silane $$(C_2H_5)_2Si(OC_2H_5)_2$$

to which was added 2.5% benzoyl peroxide was heated for 4 hours at 120° C. and for 6 hours at 150° C. in a container through which dry air was passed. An extremely viscous syrup containing a small amount of insoluble gel particles was secured. A xylol solution was prepared containing 55% solids from which the insoluble particles were removed by centrifuging. A film of the xylol solution after baking for 2 hours at 100° C. was hard and brittle, it cracked and peeled from the glass.

*Example 9.*—Gaseous ethylene oxide was bubbled through 135 parts of well agitated trichlorosilane and cooled in an ice bath until the exothermic reaction had ceased and the reaction mixture had increased 140 parts by weight. The resulting product—tris beta chloroethaxy silane boiled at 154° to 158° C. at 18 mm. The product was a clear colorless liquid with a faint odor. The tris beta chloroethoxy silane (chlorethyl silico formate)

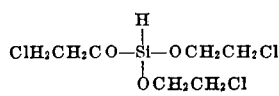

was heated for 4 hours at 170° to 180° C. and for 6 hours at 180° to 200° C. in a container through which dry air was passed to secure a relatively viscous syrup. A film baked at 150° C. for 5 hours was clear, dust-free; but tacky. A film containing 2% benzoyl peroxide was baked at 150° C. for 2 hours. A hard, brittle, tack-free film was secured.

*Example 10.*—N-butyl triethoxy silane $$C_4H_9Si(OC_2H_5)_3$$

which boiled at 190° to 195° C. was heated in a container for 12 hours at 170° to 180° C. while air, dried by passage through calcium chloride and concentrated sulphuric acid, was slowly bubbled through. The resulting syrup was exceedingly viscous and was reduced with xylol to 75% solids.

A film of the xylol solution baked for 4 hours at 150° C. was clear and dust free; but tacky.

A film of the xylol solution baked for 4 hours at 150° C. and containing 2% benzoyl peroxide was clear, non-tacky, hard, and very tough.

A film of the xylol solution baked for 4 hours at 150% C. and containing 2% lauroyl peroxide was clear, non-tacky, and tough.

A film of the xylol solution baked for 4 hours at 150° C. and containing 2% of hydroxycyclohexyl hydroperoxide was clear, non-tacky and tough.

A film of the xylol solution baked for 4 hours at 150° C. and containing 2% acetyl peroxide in dimethyl phthalate was cloudy, non-tacky and tough.

A film of the xylol solution baked for 4 hours at 150° C. and containing 2% t-butyl hydroperoxide was clear, non-tacky and tough.

A film of the xylol solution baked for 2 hours at 150° C. and containing 10% sodium perborate was clear, very hard and brittle.

A film of the xylol solution baked for 2 hours at 150° C. and containing 10% zinc peroxide was cloudy, very hard and tough.

A film of the xylol solution baked for 2 hours at 150° C. and containing 10% ammonium perborate was clear, hard and brittle.

*Example 11.*—N-butyl triethoxy silane $$C_4H_9Si(OC_2H_5)_3$$

which boiled at 190° to 195° C. was heated in a container for 6 hours at 150° to 160° C. while air, dried by passage through calcium chloride and concentrated sulphuric acid, and finally through an ozonizer was slowly bubbled through. The liquid whose viscosity was reduced with xylol, gave a hard, somewhat brittle film on baking a thin layer on glass at 150° C. for 5 hours.

*Example 12.*—N-butyl triethoxy silane $$C_4H_9Si(OC_2H_5)_3$$

which boiled at 190° to 195° C. was heated in a container, with 0.10% vanadium pentoxide suspended therein, for 6 hours at 150° to 160° C. while air previously dried by passage through calcium chloride and concentrated sulfuric acid, was slowly bubbled through. The liquid became very viscous. The liquid whose viscosity was reduced with xylol gave a hard, brittle film on baking a thin layer on glass for 4 hours at 150° C.

*Example 13.*—A commercial hydrolyzed, partially polymerized silicone resin solution containing 59 per cent toluol, was flowed on a glass plate and baked for one hour at 120° C. The baked coating was wet and tacky.

The same commercial hydrolyzed, partially polymerized silicone resin solution containing 59 per cent toluol and 1% benzoyl peroxide based on the solids content of the resin, was flowed on a glass plate and baked for one hour at 120° C. The baked coating was dust free and slightly tacky.

The same commercial hydrolyzed, partially polymerized silicone resin solution containing 59 per cent toluol in which 1% benzoyl peroxide and 1% lead as lead naphthenate based on the solids content of the resin, was flowed on a glass plate and baked for one hour at 120° C. A hard, tough baked coating was secured.

The commercial silicone resin treated in this example is known as Dow-Corning resin solution No. 2052.

Having thus set forth our invention, we claim:

1. The method of preparing polymeric organo silicon derivatives which comprises heating at a temperature above 100° C. under non-aqueous conditions an alkoxy silane having from two to three alkoxy groups attached to silicon, any remaining unsatisfied silicon valence carrying a monovalent hydrocarbon group attached to silicon, there being at least one such monovalent hydrocarbon group attached to silicon, while blowing dry oxygen through the alkoxy silane maintained in liquid condition, the heat treatment including blowing and peroxide treatments, the blowing increasing the viscosity of the material undergoing treatment, the peroxide being used in catalytic amount, and the peroxide treatment not preceding the blowing treatment, the heat treatment producing a polymerized resinous product.

2. The method of claim 1 in which the peroxide treatment is applied successively to the product resulting from the blowing treatment.

3. The method of claim 1 in which the dry oxygen is in the form of dry air and the blowing and peroxide treatments are simultaneous.

4. The method of claim 3 which includes the further step of baking the resultant product.

5. The method of claim 1 in which the organo silicon derivative is an alkoxy alkyl silane, the temperature in both the blowing and peroxide treatments is from 100 to 200° C., and the peroxide treatment is applied successively to the product resulting from the blowing treatment.

6. The method of claim 1 in which the organo silicon derivative is an alkoxy aryl silane, the temperature in both the blowing and peroxide treatments is from 100 to 200° C., and the peroxide treatment is applied successively to the product resulting from the blowing treatment.

7. The method of claim 1 in which the organo silicon derivative is an alkoxy, cyclic non-aromatic silane, the temperature in both the blowing and peroxide treatments is from 100 to 200° C., and the peroxide treatment is applied successively to the product resulting from the blowing treatment.

8. The method of claim 1 in which the silane is in solution in an organic solvent.

9. The method of claim 1 in which the alkoxy silane contains two to three ethoxy groups attached to silicon, any remaining silicon valence carrying an ethyl group attached to silicon, the temperature is from 100 to 200° C., the dry oxygen is in the form of dry air and the peroxide is non-aqueous.

10. The method of claim 9 in which the alkoxy silane is ethyl triethoxy silane.

11. The method of claim 9 in which the alkoxy silane is butyl triethoxy silane.

12. The method of claim 9 in which the alkoxy silane is diethyl diethoxy silane.

13. The method of claim 9 in which the alkoxy silane is monophenyl triethoxy silane.

14. The method of claim 9 in which the alkoxy silane is monocyclohexyl triethoxy silane.

JOHN B. RUST.
CHARLES A. MacKENZIE.

REFERENCES CITED

The following references are of record in the file of this patent:

UNITED STATES PATENTS

| Number | Name | Date |
|---|---|---|
| 2,320,536 | Pollack et al. | June 1, 1943 |
| 2,371,050 | Hyde | Mar. 6, 1945 |
| 2,392,713 | Wright et al. | Jan. 8, 1946 |
| 2,394,642 | Strain et al. | Feb. 12, 1946 |
| 2,396,692 | Garner | Mar. 15, 1946 |
| 2,399,687 | McNabb | May 7, 1946 |
| 2,415,389 | Hunter et al. | Feb. 4, 1947 |
| 2,437,204 | McGregor et al. | Mar. 2, 1948 |

OTHER REFERENCES

Rochow, Chemistry of the Silicones, Wiley, 1946, pp. 43 and 44.

Sauer, J. of Chem. Education, vol. 21, June 1944, pp. 303-305.